United States Patent
Morrison et al.

(10) Patent No.: US 6,726,872 B1
(45) Date of Patent: Apr. 27, 2004

(54) METHOD FOR FORMING PLASTIC MOLDED PANELS HAVING AN UNDERCUT EDGE

(75) Inventors: Clark Morrison, West Bloomfield, MI (US); Vittorio Strapazzini, Montelabbate (IT)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 08/225,965

(22) Filed: Apr. 8, 1994

(51) Int. Cl.[7] .................. B29C 45/14; B29C 33/12; B29C 33/18
(52) U.S. Cl. .............. 264/511; 264/161; 264/266; 264/275; 264/318
(58) Field of Search ................ 264/263, 265, 264/266, 267, 510, 511, 46.4, 46.7, 46.8, 275, 318, 161; 425/126.1, 127, 129.1, 403.1

(56) References Cited

U.S. PATENT DOCUMENTS

| | | | | |
|---|---|---|---|---|
| 4,136,150 A | * | 1/1979 | Darnall, Jr. ................ | 264/318 |
| 4,692,199 A | * | 9/1987 | Kozlowski et al. ......... | 264/511 |
| 4,793,793 A | * | 12/1988 | Swenson et al. ............ | 264/511 |
| 4,923,539 A | * | 5/1990 | Spengler et al. ............ | 264/511 |
| 4,944,908 A | * | 7/1990 | Leveque et al. ............ | 264/511 |
| 4,968,474 A | * | 11/1990 | Ito .............................. | 264/266 |
| 4,994,224 A | * | 2/1991 | Itoh et al. ................... | 264/511 |
| 5,091,031 A | * | 2/1992 | Strapazzini ................. | 264/511 |
| 5,196,151 A | * | 3/1993 | Sakaida ...................... | 264/511 |
| 5,209,880 A | * | 5/1993 | Miwa ......................... | 264/266 |
| 5,266,246 A | * | 11/1993 | Johnson et al. ........ | 264/328.12 |
| 5,326,523 A | * | 7/1994 | Güstävel et al. ............ | 264/266 |
| 5,340,425 A | * | 8/1994 | Strapazzini ................. | 264/468 |
| 5,401,456 A | * | 3/1995 | Alesi, Jr. et al. ........... | 264/511 |

* cited by examiner

Primary Examiner—Angela Ortiz
(74) Attorney, Agent, or Firm—Bill C. Panagos

(57) ABSTRACT

Plastic panels which are useful as automotive interior trim panels, interior door panels and the like decorative and structural panels, are made by a method which provides an underturned edge onto the panel. The method includes positioning blanks into a mold cavity over top of a mold ring. The blanks are secured to the mold ring and the blank is secured to the mold cavity via a vacuum. The two piece mold is mated together and a substrate is injected into the mold cavity. The cavity is opened, the ring is lifted and the formed part is removed from the mold.

10 Claims, 2 Drawing Sheets

METHOD FOR FORMING PLASTIC MOLDED PANELS HAVING AN UNDERCUT EDGE

BACKGROUND OF THE INVENION

This invention relates to a composite molded panel which may be shaped to form an interior door panel or an interior trim panel for a vehicle or to form similar types of panels used for other purposes. It is especially useful in producing vehicle interior doors and trim panels having an undercut edge.

Interior door panels for vehicles are typically made by first forming a preselected size and shape of foundation board made of stiff particle board, fiber board or plastic material which is commonly called a substrate. Then, one or more cloth-like sheets are fastened to the surface of the substrate. The substrate may also function to support other items, such as window regulator parts, small motors, wiring and the like, which are located upon or within the door. In many vehicles, the interior surfaces of the door panels are decoratively enhanced by adding inserts upon the panel. The inserts may be in the form of smaller sections or panels which may be formed, for example, of fabric or carpet-like sheets or sheets with heavily textured surfaces or sheets of different surface colors or material.

Typically, the interior door and trim panels of the type described above are assembled out of separate parts which are positioned upon the substrate and fastened together, one by one, to provide a completely assembled panel. This assembly is fastened within the metal or plastic door or within other parts of the interior of the vehicle. This technique for manufacturing interior and trim panels is relatively time consuming and expensive. Moreover, this limits the ability to significantly contour or curve the interior surface of the vehicle. For example, it is difficult to provide a curved or contoured foundation board and to cover such a curved board. Therefore, vehicle interior door surfaces are relatively flat and other trim surfaces also have limited curvatures.

Thus, this invention relates a plastic molding method for making interior door and trim panels and the like, which may be curved, and which have a downwardly curved undercut edge, at reduced cost and with enhanced decorative appearances.

SUMMARY OF THE INVENTION.

The invention herein contemplates molding a plastic panel by, first, preparing a thin, fabric flexible plastic sheet which is sized and shaped to form a blank. The blank is positioned within a mold. As the blank is positioned within the mold, the blank is pulled over a mold ring. Next, plastic molding material is placed within the mold and is molded, in situ, to form a relatively rigid plastic molded substrate whose exposed, outer surface, is made up of the composite of the fabric or plastic sheet blank. The blank could also include inserts of different materials and textures which are carried by the blank. Since the substrate is molded in situ within the thin fabric or plastic sheet blank, other objects may be simultaneously molded upon or within the substrate. For example, window parts, wires, ductwork and the like may be molded within the substrate. Alternatively, the substrate may be provided with integral portions that are configured to receive or to mount exterior mechanical parts or trim elements. Thus, this method may economically produce, for example, an interior door panel which may have curved portions and which carries separately mounted or integrally formed arm rests or window controls or other items mounted thereon, while providing an enhanced decorative appearance.

A major object of the invention is to provide an undercut or downturned edge. This is accomplished by the mold ring including a cut out portion which enables the blank to be received in the cut out portion. As the substrate is injected into the blank, the material fills in behind the blank forcing the blank into the cut out forming the downturned edge. The blank is continuous around the edge and covers the bottom of the edge. The remainder of the blank may be trimmed from the molded panel to provide an undercut on the molded panel.

A further object of the invention is to provide a method for rapidly and economically producing vehicle door panels and interior trim panels and the like with a minimum of labor and with better, more uniform quality than has previously been possible utilizing the typical panel assembly techniques which have been used in the past for making door interior panels and trim panels.

These and other objects and advantages of the present invention will become apparent upon reading the following description of which the attached drawings form a part.

DETAILED DESCRIPTION OF THE PREFERRED EMBODIMENT

Figure 1:
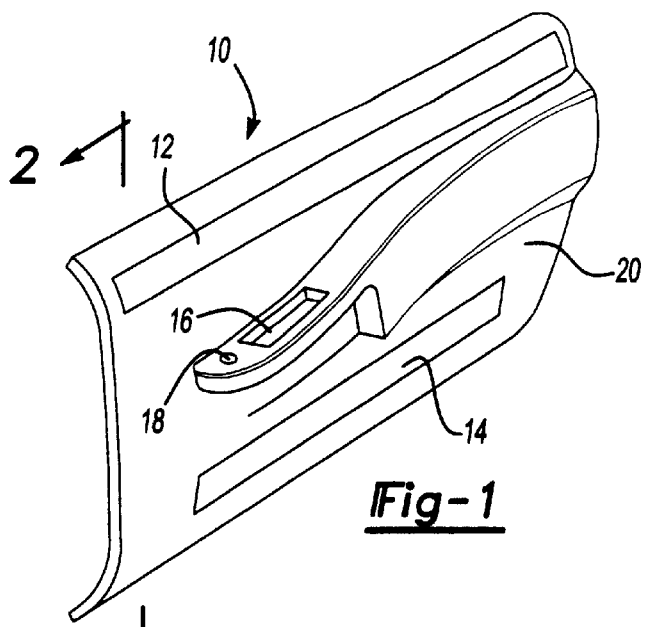
FIG. 1 is a perspective view of an automobile interior door panel which schematically illustrates a panel made in accordance with the method described herein.

FIG. 1 schematically illustrates an example of an interior door panel 10 for an automobile. The panel 10 is illustrated as being formed with undercut edges. The panel is sized and shaped to fit within a sheet metal door for trimming the interior of the door within the passenger compartment of the vehicle. The panel may include for illustration purposes, an upper panel insert 12 which may have an interior face formed so as to simulate a wood grain appearance or may be inlaid with some other material. Similarly, a lower insert 14 is positioned in the panel and may be formed of a piled carpet-like material or fabric to simulate a carpet or fabric section of the panel or may be an inlay of some other material.

The panel may be provided with various openings or receptacle areas, after the molding is completed, to receive some of the hardware which is typically mounted within a vehicle door. These openings or areas may be cut or punched into the panel. For example, the panel may have a square or oblong opening 16 to receive a block of switches which operate the window actuating motors, and a second round opening 18 which may receive switch for actuating the exterior side view mirrors. Different sized and shaped opening and receptacle areas may be molded in the panel as required.

The interior surface 20 of the panel may include embossments or may be textured. These decorated surface configurations may be formed during the molding of the panel door or may be preformed in the sheet or blank utilized in the molding.

Figure 2:
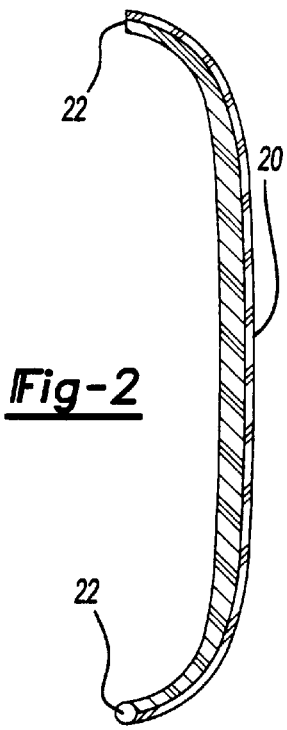
FIG. 2 is a cross sectional view of FIG. 1 along lines 2—2 thereof.
Figure 3:
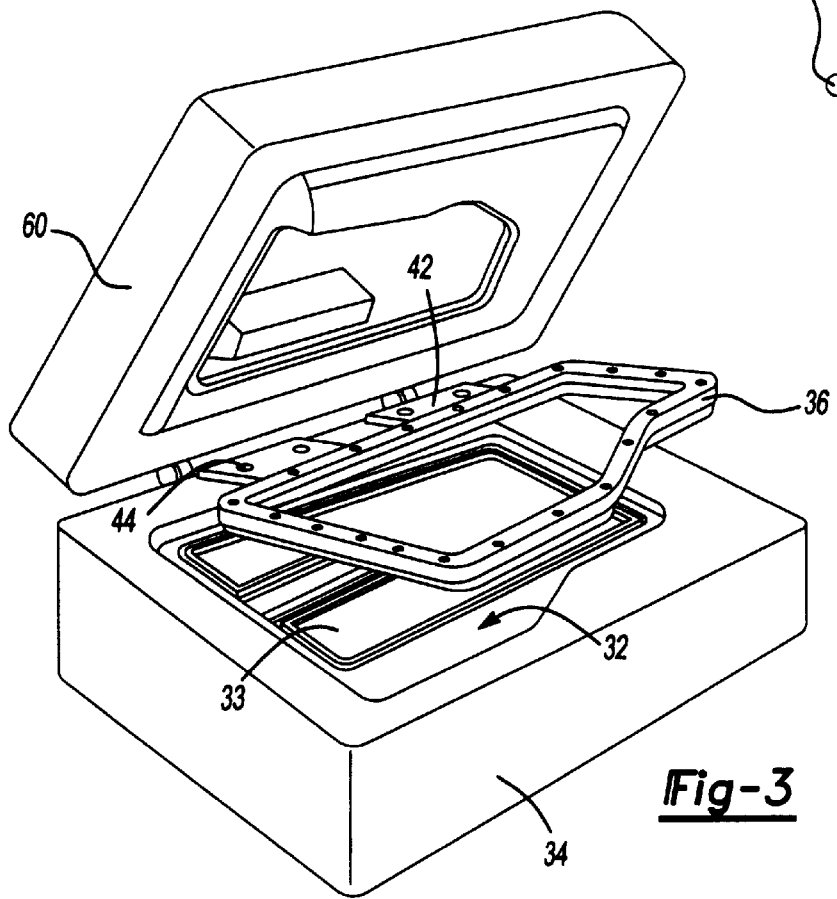
FIG. 3 is a perspective, schematic view of a mold assembly in accordance with the present invention.

As better illustrated in FIG. 2, the edge 22 of the panel 10 is undercut. The blank which is utilized to form the interior surface 20 is continuous around the edge 22, on the panel 10. The molding process begins with being provided with a blank 30 to be positioned into the mold cavity. The blank 30 may be formed by methods like those disclosed in U.S. Pat. No. 5,091,031, issued Feb. 25, 1992, the specification and drawings of which are herein expressly incorporated by reference. The blank 30 may include inserts or it may be a continuous sheet of material.

Figure 6:
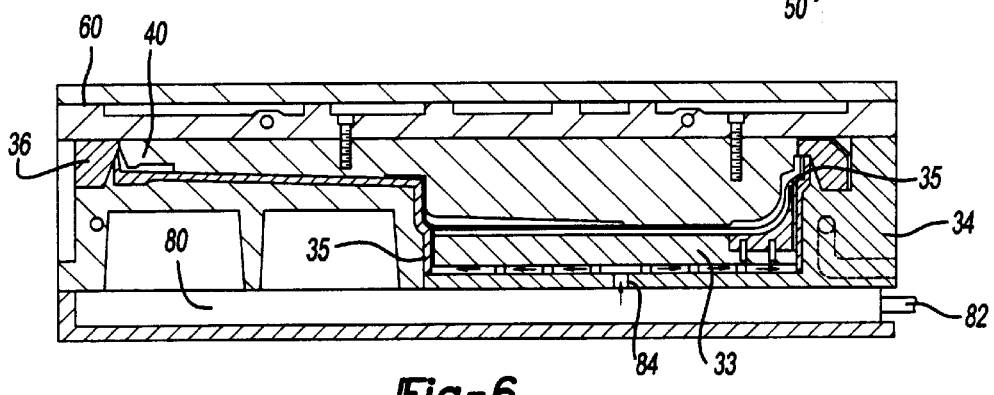
FIG. 6 is a cross sectional view of the molds in a closed position.
Figure 7:
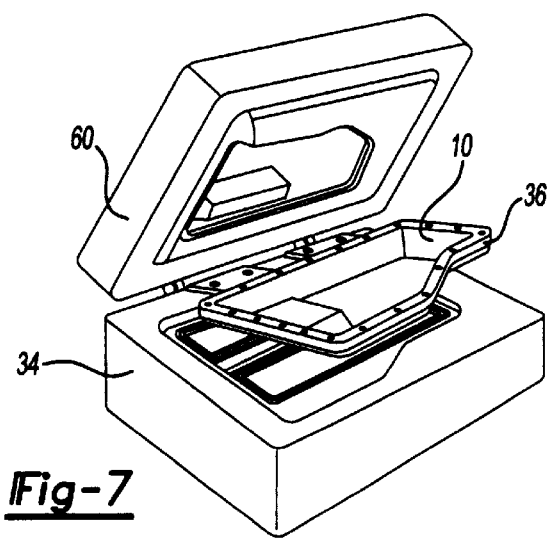
FIG. 7 is a perspective view of the molds in an open condition after forming of the part.

The blank 30 is positioned into the mold cavity 32 of mold 34 on top of the ring 36. The mold 34 is of the vacuum type, as best illustrated in FIG. 6. Once the blank 30 is positioned into the mold cavity 32 on the insert 33, the vacuum is activated around the insert 33, securing the blank onto the mold 34. The outer periphery of the blank is then secured onto the ring 36 via pins 40. The periphery of the blank 30 is pulled down on top of the pins 40 and is secured thereto.

The ring 36 is secured to the female mold via plates 42 and 44 which are secured to a hinge 46. Thus, the hinge 46 enables the ring 36 to be positioned within the cavity and to be rotated out of the cavity for removal of the panel.

Figure 4:
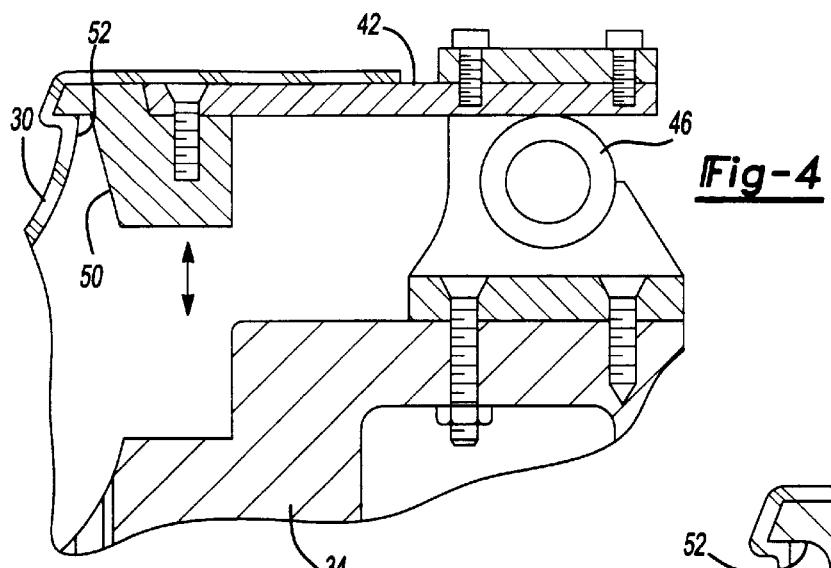
FIG. 4 is a cross sectional view of FIG. 3 along lines 4—4 thereof with the blank loaded on the ring.
Figure 5:
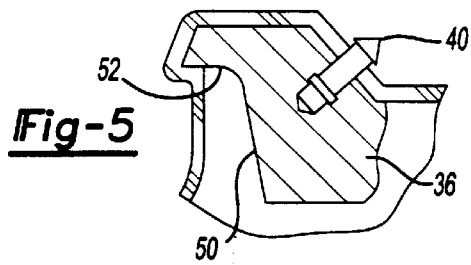
FIG. 5 is a cross sectional view of FIG. 3 along lines 5—5 thereof with the blank loaded on the ring.

As can be seen in FIGS. 4 and 5, the ring 36 includes a cut out portion 50. The cut out portion 50 has a terminal end 52 which forms the edge of the panel 10. As can be seen in the drawings, the blank 30 is drawn into the cutout to form the undercut on the panel.

After the periphery of the blank 30 is secured to the ring 36, the top mold 60 is closed onto the ring and bottom mold 34. As can be seen in FIG. 6, the substrate is injected through the mold 60 and into the mold cavity 34. Generally, polyurethane or any other plastic material or the like is utilized as the substrate and is injected into the mold cavity. The substrate is then allowed to cool in the cavity for a desired period of time. After the substrate has cured and cooled, the top mold 60 is opened. After opening of the mold, the periphery of the blank 30 is removed from the ring 36 and pins 40. The ring is then moved upward away from the mold 32 and the panel 10 is removed from the ring 36. Upon removal of the panel 10, generally the peripheral blank is cut or removed from the panel to form a finished panel. Thus, by utilizing the ring 36 with its cutout portion, an undercut can be formed at the panel edge.

If necessary, prior to adding the substrate, wiring switches or the like would be positioned onto the mold 60. If such a positioning of the elements is not necessary, the blank would be in a position like that shown in FIG. 6. At this position, the molds are mated together. The mold 60 fits into the mold 34 such that there is a gap between the blank and the mold 60. The mold 60 also includes a bore to enable passage of the substrate into cavity 32. If a second layer of less dense foam backing is required, it could be added prior to the substrate either by injection through the male mold or by spraying it onto the blank.

A suitable plastic material is injected into the mold cavity for injection molding the panel substrate therein. The injected plastic material solidifies in the cavity. Alternately, expandable plastic beads may be inserted into the mold cavity, either through the passageway or it may be placed in the cavity before the mold is closed. The application of suitable heat for the necessary time causes the expandable beads to mold the substrate and to seal it within the cavity. After the plastic solidifies, the mold panel is removed as described above. The mold panel substrate may include integral part such as molded brackets, bosses and other separate parts positioned in the interior of the mold cavity. The passage ways or openings or receptacles may also be formed in the panel during molding. By way of an example, an electric motor for operating the windows, or part of a window regulator mechanism or wires or switches or heating/air conditioning channels or the like may be positioned in the panels during molding, as previously stated.

As illustrated in FIG. 6, the mold 32 has a vacuum chamber 80 formed beneath it with a hose 82 connected to a vacuum pump, not shown. Air is sucked along the insert blade 35 from the cavity surface to the vacuum chamber for positioning and registering the blank on the mold cavity.

The methods described above are particularly useful for molding door panels and thereby replacing conventional door panel assemblies which are made up of a number of parts that are fastened together. However, the methods are also useful in forming other types of trim panels for vehicles as well as other types of panels for other uses. For example, an interior dashboard panel may be formed with inserts of various types molded in the surface of the panel. As another example, a molded headliner may be formed for use within the upper part of the passenger compartment of a vehicle.

The molding methods are useful for producing panels made of a variety of materials. By way of example, the panel substrate may be formed of a substantially rigid, structural polyurethane plastic which is commercially available from various chemical companies. The particular plastic selected will depend upon the cost, availability and the ultimate use.

The overall molded plastic panel is waterproof. Therefore, conventional water shields that typically are utilized within vehicle doors, for protecting the trim panel from water seepage due to water entering into the door cavity, are unnecessary and eliminated. This reduces the cost of the overall door assembly considerably.

While the above detailed description describes the preferred embodiment of the present invention, the invention is susceptible to modification, variation, and alteration without deviating from the scope and fair meaning of the subjoined claims.

What is claimed is:

1. A method of forming a panel having an undercut edge comprising:
   providing a die pair, one of said die pair having a cavity;
   positioning a ring including a cut out portion in said cavity;
   loading a blank into said cavity over said ring;
   closing said die pair together over said blank;
   adding a substrate into said cavity onto said blank such that said substrate forcing said blank into said cut out;
   molding said substrate and blank into a panel and forming an undercut edge in said panel;
   removing said panel from said cavity.

2. The method according to claim 1 and pulling said blank, via a vacuum, against said die cavity.

3. The method according to claim 1 and securing the blank to the ring on pins in the ring.

4. The method according to claim 1 wherein said adding comprises injecting said substrate into said cavity.

5. The method according to claim 1 and trimming excess portion of said blank from said substrate.

6. The method according to claim 1 and lifting said ring from said cavity prior to removing said panel.

7. The method according to claim 1 wherein said blank is a material selected from the group consisting of a fabric, carpet or vinyl skin.

8. The method according to claim 1 wherein said substrate is a polyurethane or other plastic material.

9. The method according to claim 1 and enabling said substrate to cool to a desired temperature in said mold prior to removing said panel.

10. The method according to claim 1 wherein said ring is movably secured with said die pair.

* * * * *